United States Patent
Schultink et al.

(10) Patent No.: US 8,852,306 B2
(45) Date of Patent: *Oct. 7, 2014

(54) VACUUM CLEANER FILTER BAG

(75) Inventors: Jan Schultink, Overpelt (BE); Ralf Sauer, Overpelt (BE)

(73) Assignee: Eurofilters Holdings N.V., Overpelt (BE)

( * ) Notice: Subject to any disclaimer, the term of this patent is extended or adjusted under 35 U.S.C. 154(b) by 1092 days.

This patent is subject to a terminal disclaimer.

(21) Appl. No.: 12/667,746

(22) PCT Filed: Jul. 3, 2008

(86) PCT No.: PCT/EP2008/005454
§ 371 (c)(1),
(2), (4) Date: May 14, 2010

(87) PCT Pub. No.: WO2009/007059
PCT Pub. Date: Jan. 15, 2009

(65) Prior Publication Data
US 2010/0218470 A1    Sep. 2, 2010

(30) Foreign Application Priority Data
Jul. 6, 2007 (EP) .................... 07013311

(51) Int. Cl.
*B01D 46/00* (2006.01)
*B01D 39/16* (2006.01)
*A47L 9/14* (2006.01)

(52) U.S. Cl.
CPC ............. *B01D 39/1623* (2013.01); *A47L 9/14* (2013.01); *B01D 39/1692* (2013.01); *Y10S 55/05* (2013.01)

USPC ................ 55/382; 55/486; 55/527; 55/528; 55/DIG. 5

(58) Field of Classification Search
None
See application file for complete search history.

(56) References Cited

U.S. PATENT DOCUMENTS

| | | | |
|---|---|---|---|
| 4,656,075 A | 4/1987 | Mudge | |
| 5,108,474 A * | 4/1992 | Riedy et al. | ..................... 55/485 |
| 5,306,534 A | 4/1994 | Bosses | |
| 6,156,086 A | 12/2000 | Zhang | |
| 2008/0257149 A1 * | 10/2008 | Ogale | ................ 95/70 |
| 2009/0056548 A1 * | 3/2009 | Woo et al. | ........................ 95/287 |
| 2009/0255404 A1 * | 10/2009 | Ptak et al. | ......................... 96/11 |

FOREIGN PATENT DOCUMENTS

| | | |
|---|---|---|
| DE | 7 424 655 | 7/2003 |
| DE | 202 09 923 U1 | 7/2003 |
| EP | 0 246 811 A2 | 5/1987 |
| EP | 0 960 645 A2 | 5/1999 |

(Continued)

OTHER PUBLICATIONS

Definition of "netting" by Free Online Dictionary (dated Jul. 15, 2013) at www.thefreedictionary.com/netting.*

(Continued)

*Primary Examiner* — Duane Smith
*Assistant Examiner* — Pankti Patel
(74) *Attorney, Agent, or Firm* — Brinks Gilson & Lione

(57) ABSTRACT

The invention relates to a vacuum cleaner filter bag having a filter medium comprising a first layer consisting of a netting, a perforated sheet or a perforated non-woven with an air permeability of at least 10,000 l/(m² s), and a first fiber layer consisting of man-made fibers and/or vegetable fibers and connected to one side of the first layer.

22 Claims, 1 Drawing Sheet

(56) References Cited

FOREIGN PATENT DOCUMENTS

| | | |
|---|---|---|
| EP | 1 048 335 A1 | 4/2000 |
| EP | 1 050 331 A1 | 4/2000 |
| EP | 1 795 248 A2 | 6/2006 |
| GB | 2 156 263 A | 10/1985 |
| JP | 6-30869 A | 2/1994 |
| WO | WO 97/40913 A1 | 11/1997 |
| WO | WO 9958041 | 11/1999 |

OTHER PUBLICATIONS

Krčma, R.; "Textilverbundstoffe", pp. 189, 201, 205-209, 250-251; Leipzig: VEB Fachbuchverlag; 1963. (Translation included).

Brockhaus, F.A.; "Der große Brockhaus Sechzehnte, Völlig Neubearbeitete Auflage in Zwölf Bänden, Vierter Band Fba-Goz", "Gitterstoff"; Wiesbaden: F.A. Brockhaus; 1954. (Translation of relevant term included).

Wikipedia; "Textiltechnik (Seite der Wkipedia)"; Fundstelle: http://de.wikipedia.org/wiki/Gelege_(Textiltechnik); Jun. 21, 2010. (Translation included).

International Search Report completed Dec. 5, 2008 for International Application No. PCT/EP2008/005454.

Yu, Xiaoling; "Study on the Structure and Properties of Vacuum Cleaner Filtering Material," Master thesis; Donghua University; Dec. 2005; 96 pages; Abstract translated.

* cited by examiner

VACUUM CLEANER FILTER BAG

This application claims the benefit under 35 U.S.C. §371 of International Application No. PCT/EP2008/005454, filed Jul. 3, 2008, which claims the benefit of European Patent Application No. 07013311.1, filed Jul. 6, 2007, which are incorporated herein by reference in their entirety.

The invention relates to a vacuum cleaner filter bag including a filter medium, and in particular to a disposable vacuum cleaner filter bag.

The development in the field of vacuum cleaner filter bags aims at increasing the filtration performance and, simultaneously, the service life. To this end, conventional vacuum cleaner filter bags normally have a bag wall consisting of a plurality of filter material layers. The filter material layers are e.g. layers consisting of filter paper or of a non-woven (i.e. non-woven fabric). The various layers fulfill different demands. In addition to the layers providing the filtration performance, layers may be provided, which increase the service life (dust holding capacity) of the filter bag as well as layers fulfilling a protecting function (e.g. impact protection).

Various possible filter structure layouts are described e.g. in EP 0 960 645, where a coarse filter layer is arranged upstream of a fine filter layer in the air flow direction, so that larger particles will be trapped by the coarse filter layer, whereas smaller particles can be held in the fine filter layer. Although the hitherto used protection and backing layers are capable of imparting to the bag the desired bursting strength or to protect also sensitive filter layers against abrasion caused by the impact of particles, they are not free from drawbacks. They reduce the permeability to air and, consequently, the maximum suction capacity of the vacuum cleaner. In order to protect sensitive layers of the bag material (e.g. a meltblown layer), comparatively compact protection layers must be used, and these layers themselves tend to become clogged with house dust. Some of the normally used backing or protection layers, such as paper, are not weldable and are therefore not suitable for use in modern plastic non-woven bags.

DE 202 09 923 discloses a dust filter bag having a perforated inner layer in the form of a perforated sheet or a netting. This perforated inner layer serves to protect subsequent filter layers against sharp-edged particles whose cross-section is larger than 100 µm. To this end, the perforations of the inner layer have a diameter of 100 µm.

A filter material including an air-permeable plastic film is known from EP 1 795 248, the plastic film fulfilling the function of a support layer and having a low permeability to air of e.g. 1200 l/(m² s).

A dust bag comprising an intermediate layer between two filter layers (e.g. a filter paper or a non-woven) is known from DE 201 10 838, the intermediate layer being used for establishing a separation between the filter layers, so that the filter layers can be displaced relative to one another.

Taking into account the prior art, it is the object of the present invention to provide a vacuum cleaner filter bag having a high mechanical stability without simultaneously having a high tendency to clog, which would reduce the service life.

This object is achieved by a vacuum cleaner filter bag according to claim 1.

Accordingly, the present invention provides a vacuum cleaner filter bag having a filter medium comprising a first layer consisting of a netting, a perforated sheet or a perforated non-woven with an air permeability of at least 10,000 l/(m² s), and a first fibre layer consisting of man-made fibres and/or vegetable fibres and connected to one side of the first layer.

Surprisingly enough, it turned out that a vacuum cleaner filter bag having a filter medium, which comprises a composite made of such a first layer with an air permeability of the type in question and such a first fibre layer, advantageously exhibits a high mechanical stability in combination with a low tendency to clog as regards house dust.

The man-made fibres (artificial fibres) can be staple fibres or endless fibres, sometimes also referred to as filaments. The vegetable fibres (natural fibres) can e.g. be cellulose fibres, in particular bamboo cellulose fibres.

The vacuum cleaner filter bag can be a disposable bag. The vacuum cleaner filter bag may especially be implemented in the form of a flat bag.

The netting may e.g. be an extruded netting or a woven netting.

The first fibre layer can be connected to the first layer in particular by a full-area connection, e.g. by means of calendering. The two layers can therefore not be displaced relative to one another. In this context, full-area does not mean that all the fibres are fully connected to one another, e.g. fused with one another, whereby a film would be obtained, but it means that the layers are interconnected at a large number of discrete locations, said locations being uniformly distributed across the whole surface of the respective layers. These locations can be predetermined, e.g. in the case of a dot calender or an engraved calender, or not predetermined, e.g. in the case of hotmelt powder and a ribbon calender.

The first layer may have a mass per unit area of 5 to 30 g/m², in particular of 7 to 20 g/m², and/or a thickness of 0.1 to 1 mm, in particular of 0.15 to 0.8 mm. This allows sufficient flexibility in combination with high strength.

The first layer can have an average hole cross-sectional area of 2 to 900 mm², in particular of 5 to 30 mm², and/or an air permeability of at least 11,000 l/(m² s), in particular of at least 13,000 l/(m² s), in particular of at least 15,000 l/(m² s).

The first layer can especially be a netting having a mesh opening of 2 mm to 30 mm. The mesh opening can be different or identical in different directions, e.g. in the x- and y-directions, i.e. in the machine direction and in the cross direction. The netting can be a rectangular, in particular a square netting. The mesh opening can especially be between 2×2 mm and 30×30 mm.

The first fibre layer of the filter media described can comprise fibres having a fineness (linear density) of at least 5 dtex, in particular of at least 10 dtex. The first fibre layer can especially consist of such fibres.

The above-mentioned parameters can especially be adapted to the size or the intended use of the vacuum cleaner filter bag. As regards the first layer, a mass per unit area of less than 15 g/m², a thickness of less than 0.5 mm and/or a mesh opening of less than 5 mm may perhaps be particularly suitable. This applies e.g. to household vacuum cleaners having comparatively small bags (volumes between 2 and 5 l). For vacuum cleaner bags intended for industrial use a greater mass per unit area and/or greater mesh openings may be of advantage.

The above-described filter media may comprise a second fibre layer made of man-made fibres and/or vegetable fibres, said second fibre layer being connected to the first layer on the side facing away from the first fibre layer. The second fibre layer may especially be connected to the first fibre layer; in particular, fibres of the first fibre layer may be connected to fibres of the second fibre layer. Fibres of the first fibre layer may be connected to fibres of the second fibre layer especially in the holes, meshes or pores of the first layer. The first fibre layer, the second fibre layer and/or the first layer may be interconnected in such a way that they cannot be moved relative to one another, in particular not displaced relative to one another.

Also the second fibre layer may have the properties and parameters which have been described for the first fibre layer. The second fibre layer may, for example, comprise fibres having a fineness of at least 5 dtex, in particular of at least 10 dtex. The properties and the parameters of the second fibre layer may, however, be chosen independently of those of the first fibre layer. The two fibre layers may, however, also be implemented in the same way.

The first and/or the second fibre layer in the above-described filter media may be thermally bonded to the first layer and/or the respective other fibre layer, in particular by means of calendering, and/or by means of an adhesive. The calendering can be executed at certain points of the layers (e.g. by means of an engraved calender). The adhesive can e.g. be a hotmelt, in particular a hotmelt powder. Other connecting methods are, in principle, possible.

The first and/or the second fibre layer can, especially before they are connected to the first layer, be implemented in the form of a web layer or a non-woven layer.

The term non-woven (i.e. non-woven fabric) is used in accordance with the definition according to the ISO standard ISO 9092: 1988 and the CEN standard EN 29092, respectively. A non-woven can especially be dry-laid or wet-laid or it may be an extruded non-woven, in particular a meltblown (meltblown microfibre non-woven) or a spunbond (filament spunbonded fabric). Wet-laid non-wovens are distinguished from conventional wet-laid paper according to the above-mentioned definition, which is also used by the International Association Serving the Nonwovens and Related Industries EDANA (www.edana.org.), i.e. when paper or filter paper is referred to in the present context it means (conventional) wet-laid paper, which is excluded in the above-mentioned definition of non-wovens. A web is a layer of fibres which are still loose, i.e. unconnected. A non-woven can then be obtained by compacting the loose fibres.

It follows that e.g. loose fibres (staple fibres, by way of example) can be deposited on a netting, a perforated sheet or a perforated non-woven, and can then be connected thereto e.g. by means of calendering. The thermal bond is established either due to the fact that the netting comprises a bicomponent material or the staple fibres comprise bicomponent fibres, or by spraying on a hotmelt for the purpose of connection or by dispersing or interspersing a hotmelt powder that can be activated especially by calendering. Separate compacting of the web layer is here not necessary. Hence, the fibre layer need not define a separate and stable filter layer; the necessary stability is only obtained in combination with the first layer (netting, perforated sheet or perforated non-woven).

In particular, the first and/or the second fibre layer can be implemented in the form of a web layer or non-woven layer of staple fibres, said layers being especially carded layers. Fibres of the first and/or second fibre layer(s) can project into the holes or pores of the first layer.

The respective first and/or second fibre layer(s) can be a dry-laid or wet-laid web layer or non-woven layer, an extruded web layer or an extruded non-woven layer.

The materials that are adapted to be used for the fibres of the fibre layers and/or for the first layer are, in principle, a great variety of plastic materials; natural fibres, e.g. cellulose fibres, may be used as well. Possible materials are e.g. polypropylene or polyester. In addition, the first layer and/or the fibres of the first and/or second fibre layer may have a bicomponent structure. The use of bicomponent fibres in the first fibre layer or the use of e.g. a bicomponent netting, i.e. a netting whose fibres have a bicomponent structure, allows in particular easy thermal bonding of the first layer and of the first fibre layer.

The first fibre layer and/or the second fibre layer can have a mass per unit area of 5 to 50 $g/m^2$, in particular of 10 to 20 $g/m^2$. Due to the netting, fibre layers having a low mass per unit area can be used, said fibre layers being sufficiently stabilized by the netting with a high air permeability and a low tendency to clog. When a first and a second fibre layer are provided, the sum of the masses per unit area of the first and of the second fibre layer can be between 10 and 50 $g/m^2$.

The above-described filter media may comprise a third fibre layer consisting of man-made fibres and/or vegetable fibres in the form of a web layer or a non-woven layer arranged on the first fibre layer on the side facing away from the first layer. Hence, the desired filtering characteristics can be adjusted by selecting the filter parameters of the various layers in a suitable manner.

The above-described filter media may comprise a fourth fibre layer consisting of man-made fibres and/or vegetable fibres in the form of a web layer or a non-woven layer arranged on the third fibre layer on the side facing away from the first fibre layer.

The first, second, third and/or fourth fibre layers may each consist of a dry-laid or wet-laid web layer or non-woven layer, an extruded web layer or an extruded non-woven layer of the type described exemplarily hereinbefore. The first, second, third and/or fourth fibre layers may, however, be implemented differently. The third fibre layer may be implemented e.g. in the form of a carded web layer. It is, for example, possible to implement the first fibre layer in the form of a carded web layer, and the third fibre layer in the form of a carded, electrostatically charged web layer. The fourth layer may be implemented e.g. in the form of an extruded web layer or an extruded non-woven layer. The layer in question may in particular be a meltblown layer.

The composite consisting of the first layer and of the first fibre layer, or of the first layer, the first fibre layer and the second fibre layer of the above-described filter media can have an air permeability of 1,000 to 12,000 $l/(m^2 s)$, in particular of 4,000 to 10,000 $l/(m^2 s)$. This kind of air permeability especially allows a high suction power to be guaranteed throughout the service life.

The filter medium can be arranged at the furthest upstream location of the bag wall of the vacuum cleaner filter bag. The first layer or the first fibre layer can especially define the innermost layer of the bag wall of the vacuum cleaner filter bag. In this case, the first layer or the first fibre layer constitutes the furthest upstream layer of the vacuum cleaner filter bag when seen in relation to the air current. Especially when the described filter media in the form of this composite are positioned at the innermost location, the filter bag will have little tendency to clog with house dust and a low flow resistance. In addition, subsequent fibre layers may then have little stability of their own without being destroyed by the suction air current. The filter medium may especially extend across the whole area of the bag wall.

The present invention additionally provides a method of making a filter medium for a vacuum cleaner filter bag, comprising the following steps:

providing a first layer consisting of a netting, a perforated sheet or a perforated non-woven with an air permeability of at least 10,000 $l/(m^2 s)$, providing, on one side of the first layer, a first fibre layer consisting of man-made fibres and/or vegetable fibres, connecting said first layer to said first fibre layer.

The above method can especially be used for producing one of the above-described filter media and, consequently, also one of the above-described vacuum cleaner filter bags.

The connection can be established especially in the form of a full-area connection. The connecting step can be executed as a thermal step. It can, in principle, be carried out such that a connection is established pointwise or areawise. In particular, it can be carried out by an engraved calender. Even if the netting, the sheet or the non-woven were deformed at individual locations due to the dot calender, the netting, the sheet or the non-woven would nevertheless provide stability of the first filter medium composite. The connection step can therefore comprise the step of passing the layers through an engraved calender. In particular, between 10 and 35% of the engraved calender may consist of a pressure surface, and the engraved calender may have a raised element density of 30-70 elements/cm$^2$ and/or a pressure surface of 0.2 to 0.9 mm$^2$/raised element.

The steps of providing can be carried out by depositing the first layer on the first fibre layer or by depositing the first fibre layer on the first layer.

The first layer and/or the first fibre layer can have the properties and parameters described hereinbefore in connection with the filter medium. The netting may e.g. be an extruded netting or a woven netting.

In the case of the above-mentioned method, the first layer can be provided as a layer having a mass per unit area of 5 to 30 g/m$^2$, in particular of 7 to 20 g/m$^2$, and/or a thickness of 0.1 to 1 mm, in particular of 0.15 to 0.8 mm.

The first layer can be provided as a layer having an average hole cross-sectional area of 2 to 900 mm$^2$, in particular of 5 to 30 mm$^2$, and/or an air permeability of at least 11,000 l/(m$^2$ s), in particular of at least 13,000 l/(m$^2$ s), in particular of at least 15,000 l/(m$^2$ s). The first fibre layer can comprise fibres with a fineness of at least 5 dtex, in particular of at least 10 dtex. The first layer can be a netting having a mesh opening of 2 mm to 30 mm.

The above described methods can additionally comprise the step of providing a second fibre layer consisting of man-made fibres and/or vegetable fibres. The second fibre layer can, in particular, be provided on the side of the first layer facing away from the first fibre layer. The step of connecting may comprise connecting the second fibre layer to the first layer, especially on the side facing away from the first fibre layer. In particular, both fibre layers can be connected simultaneously to the first layer and/or to one another. This means that the provision of the two fibre layers and of the first layer can take place prior to the connecting step.

In the case of the above-mentioned methods, the connecting step can be executed thermally, in particular by means of calendering, and/or by means of an adhesive. The thermal bond is, by way of example, established either due to the fact that the netting comprises a bicomponent material or the staple fibres comprise bicomponent fibres, and/or by spraying on e.g. a hotmelt for the purpose of connection or by dispersing or interspersing a hotmelt powder. Other connection methods may be used as well.

The second fibre layer can have the properties and parameters described hereinbefore in connection with the filter medium. The first and/or the second fibre layer may each consist of a dry-laid or wet-laid web layer or non-woven layer, an extruded web layer or an extruded non-woven layer. The first and/or the second fibre layer can especially be a staple fibre layer, in particular a carded staple fibre layer.

As has already been described hereinbefore, also materials having the above-mentioned material parameters can be used for the fibre layers and the first layer.

The present invention also provides a filter medium that can be obtained by means of the above described methods.

The present invention additionally provides a method of producing a vacuum cleaner filter bag, comprising producing a filter medium according to one of the above described methods and assembling the filter medium so as to obtain a vacuum cleaner filter bag.

Prior to the assembling step, at least one additional filter layer can be provided. This can be followed by a step of connecting the at least one additional filter layer to the filter medium prior to the assembling step.

The present invention additionally provides a vacuum cleaner filter bag that can be obtained by the above described methods.

In the following, the invention will be described in more detail making reference to examples and to the figures, in which.

For determining the various parameters, the methods described in the following are used. The air permeability is determined according to DIN EN ISO 9237: 1995-12. The device used was the air permeability tester FX3300 of the firm of Textest AG. In particular, a differential pressure of 200 Pa and a test area of 25 cm$^2$ were employed.

The mass per unit area is determined according to DIN EN 29073-1: 1992-08. For determining the thickness, the method according to the standard DIN EN ISO 9073-2: 1997-02 is used, and method A is used for an extruded netting or a perforated sheet.

The average hole cross-sectional area is determined optically, e.g. by means of a measuring microscope or through image analysis, averaging being performed over at least 100 holes, meshes and pores, respectively, and the smallest cross-sectional area parallel to the base being taken into account for each hole.

The mesh opening is determined according to DIN ISO 9044 as a distance between two neighbouring bridges or threads in the projection plane and in the middle of the mesh.

For determining the fineness, DIN EN ISO 1973: 1995-12 has been taken as a basis.

Unless otherwise noted, the above-mentioned methods are also used for determining the respective parameters of extruded nettings, perforated sheets or perforated non-woven materials.

Figure 1:
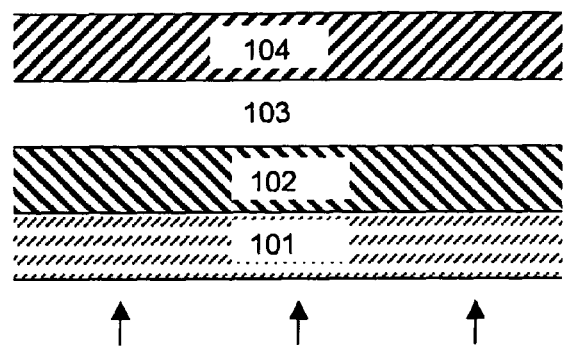
FIG. 1 shows schematically the structural design of a first exemplary filter medium.

FIG. 1 shows schematically the structural design of an exemplary filter medium. A first layer 101 is provided in the form of an extruded or woven netting, a perforated sheet or a perforated non-woven. An extruded netting of the type in question can be produced e.g. according to DE 35 08 941.

Alternatively, it would be possible to use e.g. the nettings RO3650, RO5340 of the firm of Conwed or Thermanet RO3434. For example, the netting RO3650 has an air permeability which is higher than 15,000 l/(m$^2$ s), a mass per unit area of 10.54 g/m$^2$, a mesh opening of 4.2×4.2 mm and a thickness of 0.3 mm.

Other possible materials can be obtained from DelStar Technologies, Inc., e.g. the perforated sheets X220NAT which have an air permeability of 10500 l/(m$^2$ s), a thickness of 0.26 mm and a mass per unit area of 26 g/m$^2$. A suitable woven netting can be obtained from James Dewhurst and has the number 106A78D; it has an air permeability that is higher than 14,000 l/(m² s), a thickness of 0.1 mm and a mass per unit area of 11 g/m².

The perforated non-woven can e.g. be a spunbond into which holes are punched, said holes having a diameter of e.g. 1 mm.

This first layer has connected thereto a fibre layer 102. This fibre layer may especially include loose staple fibres or filaments or it may consist of such fibres or filaments; they can be provided e.g. in the form of a carded web. Possible fibres are e.g. monocomponent fibres consisting of polypropylene or polyester, or bicomponent fibres whose shell has a melting point which is lower than that of the core of the fibre. The layer 102 may alternatively or additionally also comprise cellulose fibres. Alternatively or additionally, the first fibre layer may comprise split film fibres which can especially be charged electrostatically. The first fibre layer 102 may, alternatively or additionally, comprise blended electrostatic fibres having various triboelectric properties, which are adapted to be charged through friction, as described e.g. in U.S. Pat. No. 5,470,485 or in EP 0 246 811. The first fibre layer may in particular comprise a blend of the above-mentioned fibres.

For producing a filter medium according to FIG. 1, e.g. the first layer 101 can be deposited first, whereupon the first fibre layer 102 is deposited on said first layer 101. Alternatively, the first fibre layer 102 may be deposited first, and the first layer 101 is then deposited on said first fibre layer 102.

A connection between the first layer 101 and the first fibre layer 102 can be established in various ways. This connection can be fundamentally independent of the other layers of the filter medium. The two layers may e.g. be thermally bonded, in particular by means of calendering. For this purpose, at least one of the two layers has a thermoplastic component. The calendering can be performed in particular at certain points of the layers (by means of an engraved roller). Due to the calendering, at least a few of the fibres of the first fibre layer are connected to the first layer.

The first fibre layer 102 can be deposited e.g. in the form of loose staple fibres (web layer). This loose fibre layer has deposited thereon the first layer 101 (e.g. a netting). Subsequently, the first layer and the first fibre layer are passed through an engraved calender, whereby the fibres of the first fibre layer are thermally bonded to one another and to the first layer. In particular fibres of the first fibre layer project into the pores or holes of the first layer so that the filter medium is a composite or a laminate. The first fibre layer 102 alone would not have the necessary stability for being used as a filter layer.

According to one variant, the first fibre layer 102 may, for example, be deposited first, whereupon an adhesive, e.g. a hotmelt, can be applied thereto by spraying. Subsequently, the first layer 101 is deposited and connected to the first fibre layer 102 e.g. by means of a ribbon calender.

According to other alternatives, the connection may also be established by ultrasonic welding or hydroentanglement, as described e.g. in W. Albrecht et al., "Vliesstoffe", Wiley-VHC (2000).

The second fibre layer 103 can then follow e.g. in the form of a meltblown layer. The second fibre layer 103 is bonded to the first fibre layer 102 on the side facing away from the first layer 101. This bond can be established e.g. thermally (in particular through pointwise calendering).

A further fibre layer 104 can be provided additionally. This fibre layer can e.g. be a spunbond layer. Also the fibre layer 104 can be bonded to the other layers e.g. thermally or by means of ultrasonic welding.

When the filter medium according to FIG. 1 is used for making therefrom a vacuum cleaner filter bag, the first layer 101 will preferably be arranged as the innermost layer of the vacuum cleaner filter bag so that the fibre layer 104 will then define the outermost protective layer.

Hence, the first layer 101 is the furthest upstream layer with respect to the air current occurring in the operating condition, this being illustrated by the arrows in FIG. 1. Alternatively, the layers 101 and 102 may, however, also be interchanged, so that the first fibre layer 102 would then define the innermost layer, followed by the first layer 101, in the assembled vacuum cleaner filter bag.

Figure 2:
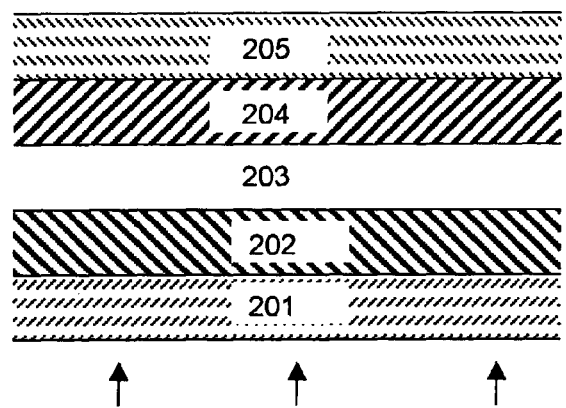
FIG. 2 shows schematically a second structural design of an exemplary filter medium.
Figure 3:
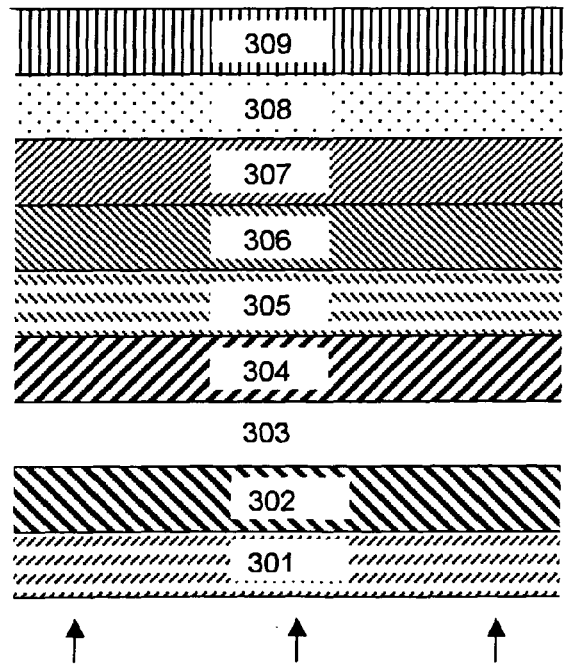
FIG. 3 shows schematically the structural design of a third exemplary filter medium.

For the bag wall of a vacuum cleaner filter bag, the filter medium shown in FIG. 1 has preferably added thereto additional layers of material, which are exemplarily shown in FIGS. 2 and 3.

FIG. 2 illustrates schematically a further example of a filter medium structure. In the example shown, the first layer 202, which may e.g. be an extruded netting, is connected to a second fibre layer 201 and a first fibre layer 203 on both sides thereof. The production process can be so conceived that e.g. one of the two fibre layers is deposited first, whereupon the first layer 202 and, finally, the other fibre layer are deposited. The fibre layers can especially be carded webs, which may, however, comprise different fibres and have different parameters (such as mass per unit area and thickness). Alternatively, the two fibre layers may, however, also be identical. When these three layers have been deposited, a connection can be established e.g. by means of an engraved calender, so that both fibre layers will be connected to the intermediate first layer.

These layers are followed by a third fibre layer 204, which can especially be a meltblown layer. This meltblown layer can be implemented analogously to the example according to FIG. 1. In the example shown, the outermost layer 205 is defined by an extruded netting or a perforated sheet and fulfills primarily a protection function. The parameters of this outermost layer may, but need not, correspond to those of the first layer 202.

The filter media shown in FIGS. 2 and 3 are suitable for defining the bag wall of a vacuum cleaner filter bag.

FIG. 3 shows schematically a further embodiment of a filter medium. In the structure shown, both sides of an extruded netting 302 are provided with a respective carded web layer 301 and 303 in the upstream direction. In a vacuum cleaner filter bag the carded web layer 301 will define the inner layer. The carded web layers 301 and 303 are connected to an extruded netting 302 by pointwise calendering (e.g. by means of an ultrasonic calender).

The web layer 304 consists of electrostatically charged staple fibres. This web layer is deposited on the carded layer 303 and is followed by two meltblown layers 305 and 306. The layers 303, 304 and 305 are also connected to one another and to the first three layers by means of an ultrasonic calender. In the downstream direction, these layers are followed by a laminate consisting of an extruded netting 308 provided with a respective carded staple fibre layer 307 and 309 on both sides thereof. In comparison with the carded staple fibre layers 301 and 303, the staple fibres of the layers 307 and 309 have, however, lower fineness values. The laminate can be obtained according to the example following hereinbelow.

According to a further example, a filter medium can consist of three layers in the form of a composite or a laminate. Two fibre layers are arranged on respective sides of a first layer in the form of a netting so that the netting is disposed between these two fibre layers. The fibre layers are carded web layers consisting of staple fibres. In the production process, the netting is deposited between the two fibre layers consisting of loose staple fibres (made e.g. of polypropylene). Subsequently, a hotmelt powder is applied or introduced in the fibre layers. This can be accomplished e.g. by sprinkling the powder onto the three superimposed layers and by shaking the layers subsequently so that the powder will precipitate.

Subsequently, the three layers are passed through a ribbon calender so that an adhesive bond will be formed by means of the hotmelt. Through this adhesive bond, fibres within the respective fibre layers are bonded to one another, fibres of the two fibre layers are bonded to the netting, and fibres of one fibre layer are bonded to fibres of the other fibre layer. The latter is accomplished through the holes or the pores of the netting, i.e. the fibres of the fibre layers project into the meshes of the netting and are bonded to one another therein. In this way, a very stable composite material is accomplished whose layers cannot be displaced relative to one another; when seen individually, the two fibre layers do not have sufficient stability for being used as independent filter layers.

It goes without saying that the layers referred to hereinbefore by way of example (e.g. layers consisting of a netting, a sheet, a web or a non-woven) may also be arranged and, if necessary, connected to one another in some other way. In addition, it goes without saying that the figures neither show the depicted layers with realistic dimensions nor do they reproduce the microscopic arrangement of the fibres of the various layers.

The invention claimed is:

1. A vacuum cleaner filter bag having a filter medium comprising:
    a first layer consisting of a netting with an air permeability of more than 10,000 $1/(m^2\ s)$, the netting having a mesh opening of 2 mm to 30 mm and a thickness of 0.1 to 1 mm; and
    a first fibre layer consisting of man-made fibres or vegetable fibres or man-made fibres and vegetable fibres and connected to one side of the first layer.

2. A vacuum cleaner filter bag according to claim 1, wherein the netting is an extruded netting or a woven netting.

3. A vacuum cleaner filter bag according to claim 1, wherein the first layer has a mass per unit area of 5 to 30 $g/m^2$.

4. A vacuum cleaner filter bag according to claim 1, wherein the first layer has an average hole cross-sectional area of 2 to 900 $mm^2$ or an air permeability of at least 11,000 $1/(m^2\ s)$.

5. A vacuum cleaner filter bag according to claim 1, wherein the first fibre layer comprises fibres having a fineness of at least 5 dtex.

6. A vacuum cleaner filter bag according to claim 1, wherein the filter medium comprises a second fibre layer made of man-made fibres or vegetable fibres, said second fibre layer being connected to the first layer on the side facing away from the first fibre layer.

7. A vacuum cleaner filter bag according to claim 1, wherein the first or a second fibre layer is/are thermally bonded to the first layer.

8. A vacuum cleaner filter bag according to claim 1, wherein the first or a second fibre layer comprises a web layer or a non-woven layer.

9. A vacuum cleaner filter bag according to claim 1, wherein the first or a second fibre layer comprises a web layer or a non-woven layer consisting of staple fibres.

10. A vacuum cleaner filter bag according to claim 1, wherein the first or a second fibre layer is a dry-laid or wet-laid web layer or non-woven layer, an extruded web layer or an extruded non-woven layer.

11. A vacuum cleaner filter bag according to claim 1, wherein the first fibre layer or a second fibre layer has a mass per unit area of 5 to 50 $g/m^2$.

12. A vacuum cleaner filter bag according to claim 1, wherein a composite consisting of the first layer and the first fibre layer, or of the first layer, the first fibre layer and a second fibre layer, has an air permeability of 1,000 to 12,000 $1/(m^2\ s)$.

13. A vacuum cleaner filter bag according to claim 1, wherein the first layer and the first fibre layer, or a second fibre layer define the innermost layer of a bag wall.

14. A method of making a filter medium for a vacuum cleaner filter bag, comprising the following steps:
    providing a first layer consisting of a netting with an air permeability of more than 10,000 $1/(m^2\ s)$, the netting having a mesh opening of 2 mm to 30 mm and a thickness of 0.1 to 1 mm,
    providing, on one side of the first layer, a first fibre layer consisting of man-made fibres or vegetable fibres or man-made fibres and vegetable fibres, and
    connecting said first layer to said first fibre layer.

15. A method according to claim 14, wherein the connecting step is executed thermally.

16. A method according to claim 14 comprising depositing the first layer on the first fibre layer, or depositing the first fibre layer on the first layer.

17. A method according to claim 14, comprising providing the netting as an extruded netting or a woven netting.

18. A method according to claim 14, comprising providing the first layer as a layer having a mass per unit area of 5 to 30 $g/m^2$.

19. A method according to claim 14, comprising providing the first layer as a layer having an average hole cross-sectional area of 2 to 900 $mm^2$ or an air permeability of at least 11,000 $1/(m^2\ s)$.

20. A method according to claim 14, comprising providing the first fibre layer comprising fibres having a fineness of at least 5 dtex.

21. A method according to claim 14, further comprising the step of providing a second fibre layer, and wherein the connecting step comprises connecting said second fibre layer to the first layer on the side facing away from the first fibre layer.

22. A method according to claim 14, wherein the connecting step is executed thermally, by means of calendering, or by means of an adhesive.

* * * * *